Oct. 12, 1937.  C. R. HANNA  2,095,744

CINEMATOGRAPHIC APPARATUS

Original Filed April 4, 1930

WITNESSES:
C. J. Weller
Hymen Diamond

INVENTOR
Clinton R. Hanna.
BY
F. W. Lyle
ATTORNEY

Patented Oct. 12, 1937

2,095,744

UNITED STATES PATENT OFFICE 2,095,744

CINEMATOGRAPHIC APPARATUS

Clinton R. Hanna, Wilkinsburg, Pa., assignor to Westinghouse Electric & Manufacturing Company, a corporation of Pennsylvania Original application April 4, 1930, Serial No. 441,583. Divided and this application June 19, 1935, Serial No. 27,359

7 Claims. (Cl. 88—18.4)

My invention relates to improvements in cinematographic apparatus and it has particular relation to intermittent movements.

The present application is a division of my copending application, Serial No. 441,583, filed April 4, 1930, and assigned to the Westinghouse Electric & Manufacturing Company.

It is an object of my invention to provide for a picture projection system, an intermittent movement that shall advance the film through a small fraction of its total period of operation.

A further object of my invention is to provide an intermittent movement of simple structure for a motion picture machine by the operation of which the film shall be advanced rapidly and shall consequently be at rest during comparatively large fractions of the total period of projection of a frame.

Another object of my invention is to provide an intermittent movement that shall operate quietly and that shall, therefore, be particularly adapted for a motion picture machine that is to be utilized in the home.

According to my invention, I provide an intermittent movement comprising a cam and a cam follower. The cam is of the peripheral heart-shaped type. The arcs of the cam which coact with the cam follower to advance the film are, in contrast to those of the prior art, greater than 90° and in general of the order of 115°. The rapid advancement of the film is also materially aided by pivoting the cam follower between the shaft of the cam and the claws. In prior art structures, the cam is rotated between the claws and the pivoted point.

Quiet operation of the apparatus is produced by providing a cam follower which is resiliently held in engagement with the cam. The cam is maintained continually in engagement with the cam follower and impacts between the cam and the cam follower are avoided.

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawing, in which:

Figure 1:
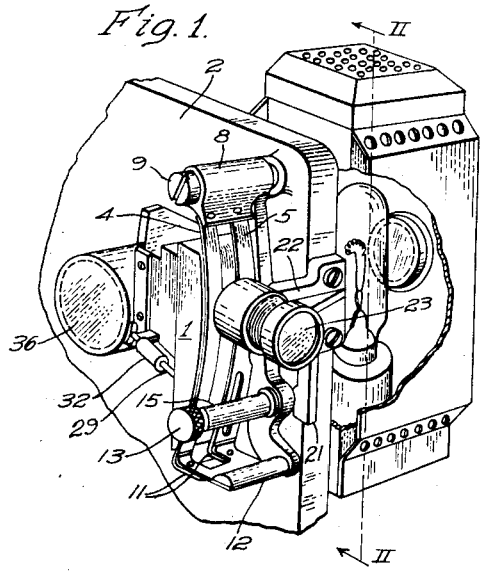
Figure 1 is a view, in perspective, of a section of a machine wherein my improvement is embodied.
Figure 2:
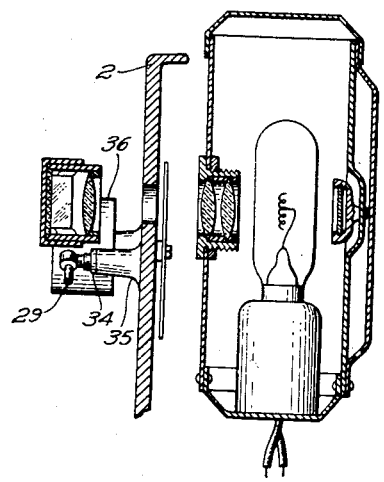
Fig. 2 is a view, in section, taken in the direction II—II of Fig. 1.
Figure 3:
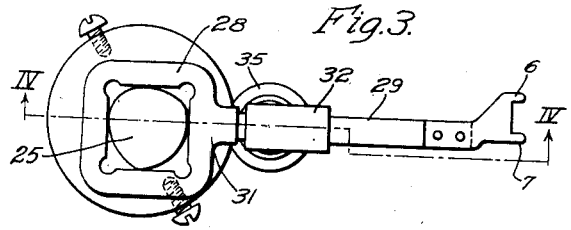
Fig. 3 is a plan view, of the principal elements of the intermittent movement of the machine.

The apparatus shown in the drawing comprises a curved aperture plate 1 supported on the main plate 2 of a cinematographic machine, on which a film-strip is to be positioned by a plurality of tensioned shoe-straps 4 and 5 and over which it is intermittently advanced by a plurality of claws 6 and 7.

The shoe-straps 4 and 5 are rigidly fastened to a bracket 8 pivotally supported on a stud 9 projecting from the main plate 2 of the machine, and they are held in tension by a plurality of flat springs 11 fastened, at one end, to the straps and, at the other end, to a finger 12 riveted to the strap-supporting bracket 8.

A knurled knob 13, pinned to a shaft (not shown) that is slidably supported in a sleeve 15 riveted to the bracket 8, is provided for moving the shoe straps 4 and 5 relative to the plate 1. The sleeve 15 is equipped with a cavity (not shown) wherein a spring (not shown) is disposed. The latter engages an inwardly-extending shoulder (not shown) in the sleeve 15 and a shoulder (not shown) on the shaft and resiliently urges the shaft into engagement with a finger 21 projecting downward from a bracket 22 that supports a projection lens 23.

The projecting end of the shaft coacts with the inner end of the finger 21 to hold the shoe-strap bracket 8 in closed position and it reacts with the outer end of the finger 21 to hold it in open position. By exerting an axial force on the knob 13, opposite in direction to the force exerted by the spring, the shaft may be disengaged from the bracket 21. However, when the knob is released, the shaft, if unconstrained, automatically returns to one of its engaging positions.

In the particular embodiment of my invention described herein, the intermittently-operating claws 6 and 7, in advancing the film, coact with the sprocket holes on one of its sides only. On the other hand, the shoe-straps 4 and 5 engage the film on its margin where the sprocket holes are ordinarily situated. Since the claws must be provided with an unobstructed passage through the film, the shoe strap 5, on the side of the film on which the engagement takes place, is distended and slotted in the region where the claws traverse the film.

The intermittent movement comprises chiefly a peripheral cam 25, rigidly supported on one end of a shaft 26 that is driven through a gear 27 disposed on the other end thereof, and a square frame 28 adapted to continually engage the periphery of the cam at a plurality of points.

A rod 29 fastened to a boss 31 integral with the square frame 28 and slidably mounted in a sleeve 32 rigidly supports the film-advancing claws 6, 7 and motivates them as it moves under the action of the square cam-follower 28. The sleeve is fastened to a boss 35 in the main plate 2 and is capable of rotating relative thereto. The claw-supporting rod 29 is thus adapted to slide and pivot under the action of the cam 25.

A cover 36, equipped with an opening for the claw-supporting rod 29, encloses the cam and square and prevents the lubricant disposed between the surfaces from being ejected.

Figure 5:
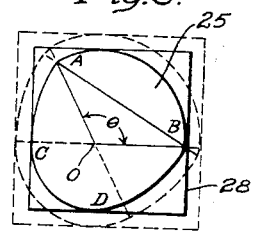
Fig. 5 is a schematic drawing of the cam and follower, showing its geometric structure.

The geometric structure of what I define as a peripheral cam is illustrated in Fig. 5, in which O represents the center of the cam shaft, AB and CD are arcs of two circles concentric with C, AC is an arc of a curve of which B is a center and BC is a radius, and BD is an arc of a circle of which A is a center and AD, which is equal to BC, is the radius. To round out the sharp corners of the cam, the radii are increased by an equal amount, and the requisite fillets are added between the arcs, as shown in the configuration by broken lines.

In constructing the cam, the arbitrarily assigned quantities are ordinarily the angle $\theta$ between AO and OB and the maximum distance that a follower is displaced by the cam surfaces; that is OB—OC.

It is easily shown, however, that $$OB - OC = 2OB\left(1 - \sin\frac{\theta}{2}\right)$$

Hence OB is determined.

From the point O located on a plate of the material from which the cam is constructed, the two lines OA and OB are drawn, making an angle $\theta$ with each other. With O as a center and OB as radius, the arc AB is inscribed, with A as center and AB as radius, the arc BD is inscribed and with B as center and AB as radius, the arc AC is inscribed. Finally the arc CD having its center at O is inscribed tangent to arcs AC and BD. The arcs for the cam with filleted corners may now be inscribed, as suggested hereinabove, and the cam may be milled out by allowing the cutter to follow the arcs.

The cam follower 28 is moved substantially in a vertical direction during the time when the arcs AC and BD are in contact with its horizontal edges, and it is moved substantially in a horizontal direction during the time when these arcs are in contact with its vertical edges. Hence, the fraction of the time required for one complete rotation of the cam, that is occupied in projecting the picture, increases as the angle $\theta$ between AO and BO increases.

The cams included in intermittent movements constructed according to the teachings of the prior art with which I am familiar have an angle corresponding to $\theta$ that is, at most, equal to 90°. On the other hand, the cam comprised in my improved intermittent-movement apparatus has an angle $\theta$ of approximately 115°; and thus the actual film-projection time is materially increased.

Figure 6:
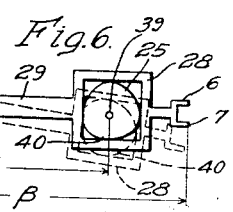
Fig. 6 is a schematic drawing of a cam and its operated device having intermittent movement according to the teachings of the prior art.
Figure 7:
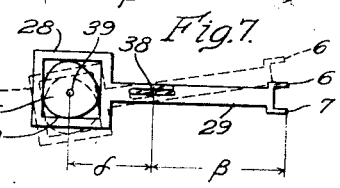
Fig. 7 is a schematic drawing of a cam and its operated device having an intermittent movement according to my invention.

Attention is furthermore called to the fact that the region wherein the claw support slides and pivots is, in my improved intermittent motion, located between the claws and the cam as shown in Fig. 7. A device thus constructed has a twofold advantage over the older intermittent motions, wherein the cam is disposed between the claws as shown in Fig. 6.

1. By a simple mathematical consideration, it can be shown that the radius of curvature of the trajectory described by the lower claw at its point of intersection with the line determined by the shaft center and the pivot is defined by the equation (1) $$r = \frac{\beta^2}{\beta + \alpha}$$

for the device shown in Fig. 6.

In this equation, $\beta$ is the distance between the center of the pivot 38 and the end of the lower claw 7 in the aforementioned position and $\alpha$ is the distance between the shaft center 39 and the pivot center 38. The corresponding property of the claw-trajectory of Fig. 7 is defined by (2) $$r = \frac{\beta^2}{\beta - \alpha}$$

Since the path traversed by a claw is small, as compared with $\alpha$ and $\beta$, it is obvious that it coincides throughout its useful range with the arc of a circle described according to Equation (1) or Equation (2), as the construction may require. Hence, from Equation (2), it is seen that the arcuate path described by the claw 7, in the intermittent motion provided by my invention, can have any predetermined curvature. That is, the curve can be convex with reference to the cam if $\beta$ is made less than $\alpha$, concave with respect to the cam if $\beta$ is greater than $\alpha$, and a straight line if $\beta$ is equal to $\alpha$.

Since it is desirable to give the aperture plate a certain curvature and, furthermore, since the cam required by a rectilinear vertical motion of the claws is rather large, the ratio of $\beta$ to $\alpha$ in the intermittent movement embodied in my invention is made approximately equal to 2.

2. It is to be noted that the edges of the cam-follower 28 do not remain parallel to their original position as the follower is moved. Since the follower is rigidly fastened to the claw-supporting bar 29, it must pivot about the surface of the cam 25 in accordance with the position assumed by the rod 29.

Figure 4:
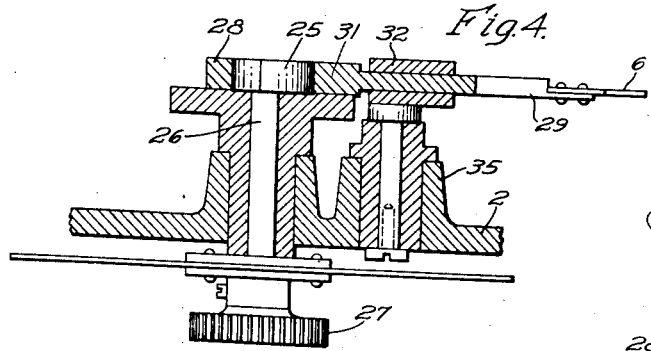
Fig. 4 is a view, in section, taken along line IV—IV of Fig. 3.

In the device shown in Fig. 4, the follower has an angular motion in the same direction as the cam, while, in the device shown in Fig. 5, the two angular motions are opposite in direction. As is clearly seen from this drawing, the lowest point of contact 40 between the cam and the follower is, in Fig. 6, advanced beyond the analogous point for a cam and a non-pivoting follower by an angle equivalent to the angle through which the sides of the follower have been rotated from its initial position. On the other hand, the lowest contact point of a cam and a non-pivoting cam follower leads the corresponding contact point 40 for the device of Fig. 7 by a similar angle. It follows then that, for identical cams, equal distances between pivot and cam-shaft center, and equal total lengths for the pivoting arms, the cam shown in Fig. 6, which represents the older movement, moves through a greater angle in advancing the film one frame than the cam shown in Fig. 7, which represents my improved movement.

The advantage is of considerable importance in obtaining small film-moving time with a comparatively small cam since the ratio of film-moving-time to film-resting-time decreases as the angle θ increases, while the dimensions of the cam required to give the claws a predetermined motion in one direction increases with θ.

Figure 8:
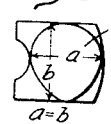
Figs. 8, 9, 10, 11 and 12 are schematic drawings showing a plurality of configurations that may be given to the cam-follower.
Figure 9:
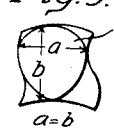
Figure 10:
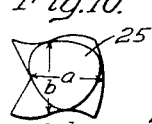
Figures 11, 12:
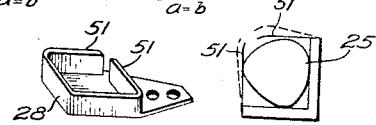

In Figs. 8 to 10, various possible structures of the cam follower are shown. The structure utilized to obtain quiet operation is shown in Figs. 11 and 12. In Fig. 11, a cam follower wherein two sides of the square frame are supplanted by flat springs 51 is shown diagrammatically. In Fig. 6, a practical structure is illustrated. To provide the structure shown in Fig. 6, the follower is stamped from sheet metal and the flat springs 51 are provided by separating the sides indicated as 51 from the base of the cam follower. In a structure of this type, the cam is held snugly in contact with the follower and the racket that ordinarily arises from a loosely fitting cam is eliminated without any considerable expense.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. An intermittent feed for a web comprising web-moving means and means for engaging and disengaging said web-moving means to and from said web to intermittently advance said web including a cam the periphery of which is composed of a plurality of surfaces, two of which are coaxial circular cylindrical surfaces of different radii and on opposite sides of the axis, said cam to be rotated about an axis that coincides with the axis of said circular cylindrical surfaces and said circular cylindrical surfaces subtending an angle substantially greater than 90° at said axis, a cam follower tangent to said cam at a plurality of points whereby it is moved when said cam is rotated, means for connecting said web-moving means to said follower whereby said web-moving means is actuated by said cam follower in accordance with the motion thereof to intermittently engage, advance, and disengage said web.

2. Motion picture apparatus, comprising a mechanism in which a motion picture film is interposed in the path of a light beam, film-moving means for advancing the film through said mechanism and means for engaging and disengaging said film-moving means to and from said film to intermittently advance said film; the last said means including a cam the periphery of which is composed of a plurality of surfaces, two of which are coaxial circular-cylindrical surfaces of different radii and on opposite sides of the axis, said cam to be rotated about an axis that coincides with the axis of said circular-cylindrical surfaces and said circular-cylindrical surfaces subtending an angle substantially greater than 90° at said axis, a cam follower tangent to said cam at a plurality of points whereby it is moved when said cam is rotated and means for connecting said film-moving means to said follower whereby said film-moving means is actuated by said cam follower in accordance with the motion thereof to intermittently engage, advance, and disengage said film.

3. Motion picture apparatus particularly adapted for use in the home comprising a mechanism in which a motion-picture film is interposed in the path of a light beam, film-moving means for advancing said film through said mechanism and means to engage and disengage said film-moving means to and from said film, to advance said film intermittently; the last said means including a cam the periphery of which is composed of a plurality of surfaces two of which are coaxial circular-cylindrical surfaces of different radii, located on opposite sides of the axis, said cam to be rotated about an axis that coincides with the axis of said circular-cylindrical surfaces, cam-following means to be moved by said cam when it is rotated, said cam-following means including at least two substantially plane rigid faces adjacent and at an angle to each other adapted to contact said cam at a plurality of points, resilient means biasing said cam-following means for maintaining both of the rigid faces of said following means in contact with said cam continuously at a plurality of points and means for rigidly connecting said film-moving means to said follower whereby said film-moving means is actuated by said cam follower in accordance with the motion thereof to intermittently engage, advance, and disengage said film.

4. An intermittent-movement mechanism comprising a cam, the periphery of which is composed of a plurality of surfaces, two of which are portions of coaxial circular cylinders having different radii, a cam follower rigidly connected to a drive-member and comprising two substantially plane rigid faces adjacent and at an angle to each other substantially parallel to the common axis of said cylinders and adapted to engage said cam at two separate points, resilient means on the follower for maintaining said cam follower in engagement with the surfaces of said cam, and means for continuously revolving said cam about the common axis of said cylinders.

5. An intermittent-movement mechanism comprising a cam, the periphery of which is composed of a plurality of surfaces, two of which are portions of coaxial cylinders having different radii, a cam follower rigidly connected to a drive-member and comprising two substantially plane faces adjacent and at right angles to each other and parallel to the common axis of said cylinders adapted to engage said cam at two separate points, resilient means on said follower for maintaining both said faces in engagement with the surfaces of said cam, and means for continuously rotating said cam about the common axis of said cylinders.

6. In combination, a peripheral cam which is composed of a plurality of surfaces, two of which are portions of coaxial circular cylinders having different radii, and a cam follower comprising four faces parallel to the common axis of said cylinders and lying in the sides of a square, the length of each side of which is substantially equal to the sum of the radii of said circular cylinders, two adjacent members of said four faces being resiliently mounted relative to the other two faces.

7. An intermittent-movement mechanism comprising a cam, the periphery of which is composed of a plurality of surfaces, two of which are portions of coaxial circular cylinders having different radii, a cam follower rigidly connected to a drive-member and comprising at least two substantially plane rigid faces adjacent and at an angle to each other substantially parallel to the common axis of said cylinders and adapted to engage said cam at two separate points, resilient means biasing said cam follower for maintaining both of the said rigid faces of said cam follower at all times in engagement with the surfaces of said cam, and means for continuously revolving said cam about the common axis of said cylinders.

CLINTON R. HANNA.